United States Patent [19]
Zdepski et al.

[11] Patent Number: 6,006,256
[45] Date of Patent: Dec. 21, 1999

[54] SYSTEM AND METHOD FOR INSERTING INTERACTIVE PROGRAM CONTENT WITHIN A TELEVISION SIGNAL ORIGINATING AT A REMOTE NETWORK

[75] Inventors: Joel Zdepski, Mountain View; Larry J. Gardner, Los Altos, both of Calif.

[73] Assignees: OpenTV, Inc., Mountain View; Sun Microsystems, Inc., Palo Alto, both of Calif.

[21] Appl. No.: 08/615,568

[22] Filed: Mar. 11, 1996

[51] Int. Cl.[6] .................................................. H04N 7/10
[52] U.S. Cl. .......................... 709/217; 345/327; 348/12
[58] Field of Search ............................. 348/6, 7, 10, 12, 348/13, 460, 461–468, 473–486; 455/3.1, 3.2, 4.1, 5.1, 6.1, 6.2, 6.3; H04N 7/10, 7/00, 7/114

[56] References Cited

U.S. PATENT DOCUMENTS

| | | |
|---|---|---|
| 5,400,402 | 3/1995 | Garfinkle . |
| 5,448,568 | 9/1995 | Delpuch et al. . |
| 5,734,413 | 3/1998 | Lappington ............................. 348/12 |

FOREIGN PATENT DOCUMENTS

| | | |
|---|---|---|
| 95 119809 | 12/1995 | European Pat. Off. . |
| 95 15654 | 6/1995 | WIPO . |
| 95 28799 | 10/1995 | WIPO . |
| 95 31069 | 11/1995 | WIPO . |
| 96 10888 | 4/1996 | WIPO . |

*Primary Examiner*—Nathan Flynn
*Attorney, Agent, or Firm*—Conley, Rose & Tayon, PC; B. Noel Kivlin

[57] ABSTRACT

A digital broadcast station is configured to "turn around" and add interactive programming to a television signal conveyed by a remote network. Prior to conveying the television signal, the remote network inserts a trigger within the vertical blanking interval of the signal. The trigger contains command information to control the loading and/or playing of a designated interactive program. After the trigger is combined with the television signal, the combined signal is modulated and transmitted from the remote network via a satellite uplink. This combined signal is correspondingly received at the digital broadcast station where it is digitized and routed through a video network for channel assignment and other processing. From the video network, the digitized television signal is provided to a VBI decoder which extracts the trigger. The extracted trigger is provided to an interactive flow manager and server to control the loading or playing of an interactive program identified by the trigger. The remainder of the digitized television signal is provided to a video encoder where it is compressed. An AVI generation unit of the digital broadcast station then combines the compressed television signal and the interactive program to form an AVI signal to be broadcast to end users via a satellite uplink.

41 Claims, 4 Drawing Sheets ized and routed through a video network for channel assignment

SYSTEM AND METHOD FOR INSERTING INTERACTIVE PROGRAM CONTENT WITHIN A TELEVISION SIGNAL ORIGINATING AT A REMOTE NETWORK

BACKGROUND OF THE INVENTION

1. Field of the Invention

This invention relates to interactive television systems and more particularly to the insertion of interactive program content within a television signal originating at a remote network.

2. Description of the Relevant Art

The emerging technology of interactive television holds a promise of allowing a television set to serve as a two-way information distribution mechanism. Proposed features of interactive television accommodate a variety of marketing, entertainment and educational capabilities such as allowing a user to order an advertised product or service, compete against contestants in a game show, or request specialized information regarding a televised program. Typically, the interactive functionality is controlled by a "set top" decoder which executes an interactive program written for the television broadcast. The interactive functionality is often displayed upon the television's screen and may include icons or menus to allow a user to make selections via the television's remote control.

Several unique problems are posed for a digital broadcaster of interactive television, particularly for configurations involving "turn arounds". The term "turn around" refers to a configuration in which a video feed originating at a remote network comes into the digital broadcast plant. The video feed from the remote network is often in an analog format and may be a live telecast. When the video feed is received at the digital broadcast plant, it is demodulated or decoded and converted into the native format of the digital broadcast plant. One such native format is SMPTE-259M, which is a 270 Mbps digital studio standard. The native video signal is routed throughout the broadcast plant, possibly taped and time shifted, and is subsequently routed to a video encoder where it is compressed and retransmitted. For the vast majority of broadcasts, the content does not reside within the digital broadcast plant for more than several hundred milliseconds.

If a digital broadcaster desires to add interactive functionality to a television signal originating at a remote network, the interactive programming information must be inserted at the proper time. However, present practices are such that the digital network operator does not need, nor have, elaborate information regarding the content playing on the turn around channel. Although there is sufficient information to build a program guide indicating the approximate times of the airings of specific programs, there is not sufficient information to determine exactly when a particular program will begin, when commercials will be played, and whether certain preemptive actions have been taken. This information remains with the program originator, which is geographically remote and typically operated as a separate business.

To complicate the problem still further, the order of playing interactive content and the ability to invoke "day of air" edits should be controlled by the signal originator. Although the interactive programming information could be provided directly by the signal originator, most remote networks are neither equipped to provide interactive programming nor have suitable transmission formats and bandwidth to allow for interactive content. In addition, it is often desirable that the digital broadcaster be able to maintain control over the actual airing and content of the interactive programming, which is typically not possible or practical if the interactive programming information is provided directly by the signal originator.

SUMMARY OF THE INVENTION

The problems outlined above are in large part solved by a system and method for inserting interactive program content within a television signal in accordance with the present invention. In one embodiment, a digital broadcast station is configured to turn around and add interactive programming to a television signal originally conveyed by a remote network. Prior to conveying the television signal, the remote network inserts a trigger within the vertical blanking interval (VBI) of the signal. The trigger contains command information to control the loading and/or playing of an interactive portion of the interactive program.

After the trigger is combined with the television signal, the combined signal is modulated and transmitted from the remote network via a satellite uplink or other transmission mechanism. This combined signal is correspondingly received at the digital broadcast station where it is digitized and routed through a video network for channel assignment and other processing. From the video network, the digitized television signal is provided to a VBI decoder which extracts the trigger. The extracted trigger is provided to a server which controls the loading or playing of an interactive program identified by the trigger. The remainder of the digitized television signal is provided to a video encoder where it is compressed. An AVI (audio-video interactive) generation unit of the digital broadcast station then combines the compressed television signal and the interactive program to form an AVI signal to be broadcast to end users via a satellite uplink. The AVI signal may be formed by time-multiplexing packetized audio, video and interactive components of the AVI signal. In this manner, interactive programming information may be advantageously provided at the proper time with a television signal being turned around at the digital broadcast station. The remote network may control the order of playing of the interactive programming information and may invoke day of air edits, while the digital broadcast station is allowed to maintain control over the content and actual airing of interactive programming information.

Broadly speaking, the present invention contemplates an interactive television system comprising a remote network and a broadcast station. The remote network includes a television signal source for providing a television signal (or other video signal), a trigger generator configured to generate an interactive command to control an interactive program associated with the television signal, and a trigger insertion unit configured to generate a combined signal including the television signal and the interactive command. The remote network also includes a transmitter coupled to receive the combined signal and configured to convey the combined signal by a wired or wireless transmission.

The broadcast station includes a receiver configured to receive the combined signal, a trigger extraction unit configured to extract the interactive command from the combined signal, and an interactive program source configured to control the interactive program in response to the interactive command. The broadcast station further includes an interactive TV signal generation unit configured to combine the television signal with the interactive program to form an audio-video-interactive output signal.

The present invention further contemplates a method for providing interactive program content with a television signal originating at a remote network. The method comprises generating an interactive command at the remote network to control an interactive program associated with the television signal, combining the television signal with the interactive command to form a combined signal, and transmitting the combined signal from the remote network via a wired or wireless transmission. The method further comprises receiving the combined signal at a broadcast station, extracting the interactive command from the combined signal, and controlling an interactive program source in response to the interactive command extracted from the combined signal.

BRIEF DESCRIPTION OF THE DRAWINGS

Other objects and advantages of the invention will become apparent upon reading the following detailed description and upon reference to the accompanying drawings in which.

Figure 1:
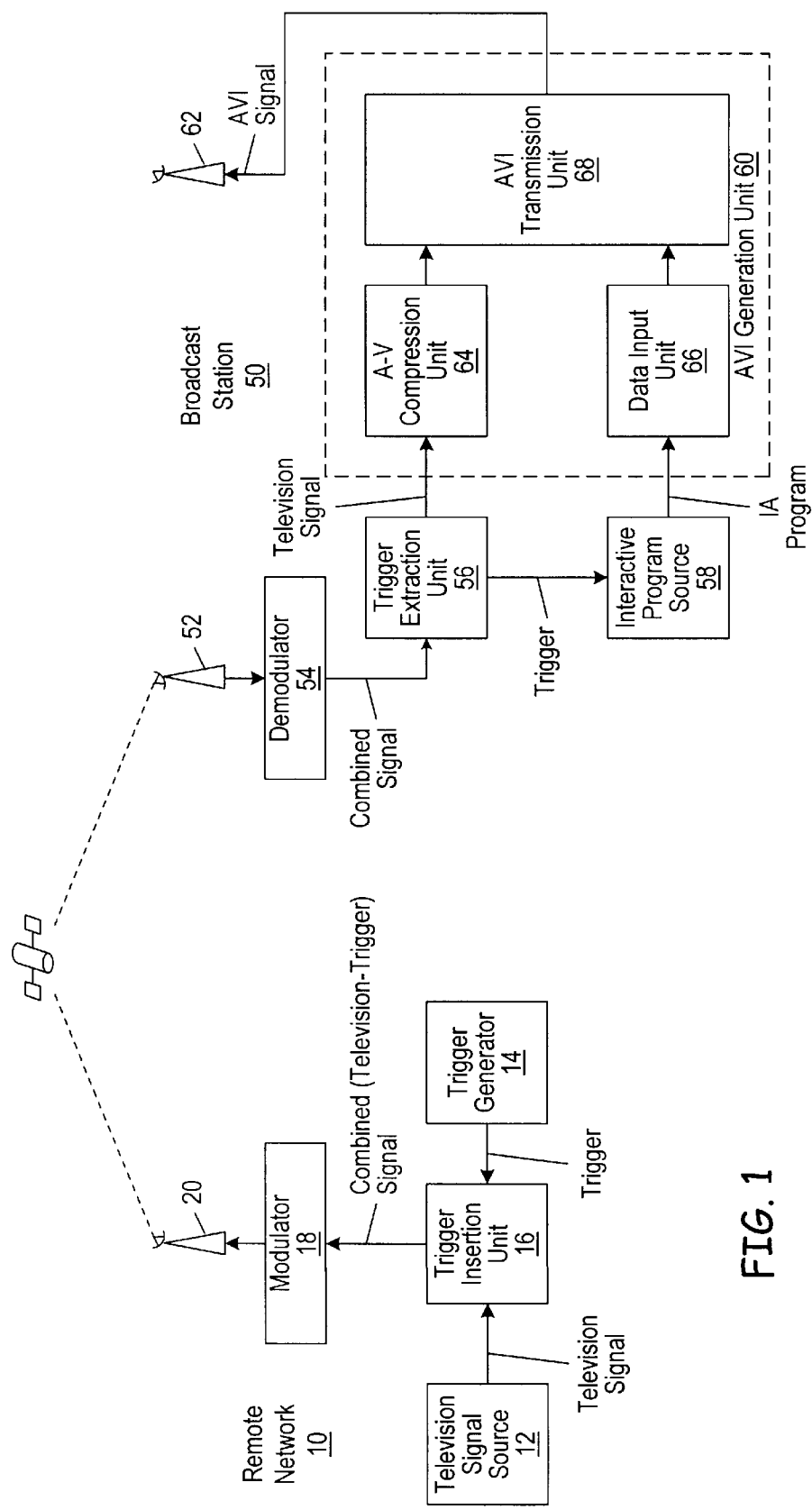
FIG. 1 is a block diagram of a flow manager and server architecture for an interactive television system in accordance with an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a block diagram of system for inserting interactive program content within a television signal in accordance with an embodiment of the present invention. The system of FIG. 1 includes a remote network 10 for transmitting a television signal via satellite, and a broadcast station 50 which receives the television signal and provides interactive programming material therewith to form an AVI (audio-video-interactive) signal. The AVI signal is then transmitted by broadcast station 50 for receipt by end-users or a subsequent distribution link.

Remote network 10 illustratively includes a television signal source 12 and a trigger generator 14 coupled to a trigger insertion unit 16. An output of trigger insertion unit 16 is coupled to a transmitter collectively formed by a modulator 18 and a satellite uplink 20.

Broadcast station 50 includes a receiver collectively formed by a satellite downlink 52 and a demodulator 54. An output of demodulator 54 is coupled to a trigger extraction unit 56, which in turn is coupled to an interactive program source 58 and an AVI generation unit 60. An output of the AVI generation unit 60 is finally shown coupled to a satellite uplink 62. For the embodiment of FIG. 1, AVI generation unit 60 illustratively includes an A-V (audio-video) compression unit 64 and a data input unit 66 coupled to an AVI transmission unit 68.

Generally speaking, trigger insertion unit 16 receives a television signal from television signal source 12 and provides a trigger therewith to form a combined television-trigger signal. The trigger, which includes command information to control the loading and/or playing of an interactive program to be associated with the television signal, is generated by trigger generator 14. The combined signal is then provided to modulator 18 where it is modulated upon a carrier in a manner suitable for transmission via satellite uplink 20.

The transmission from remote network 10 is received by broadcast station 50 at satellite downlink 52 and is provided to demodulator 54. Following demodulation, the combined television-trigger signal is provided to trigger extraction unit 56 where the trigger is extracted. The extracted trigger is subsequently provided to an interactive program source 58 to control the loading or playing of the interactive program associated with the trigger. The remainder of the television signal is provided to A-V (audio-video) compression unit 64 of AVI generation unit 60 for compression.

When an interactive program is output from interactive program source 58 in accordance with the trigger extracted by trigger extraction unit 56, the interactive program is provided to AVI transmission unit 68 through data input unit 66. Compressed audio and video are similarly provided to AVI transmission unit 68 from A-V compression unit 64. AVI transmission unit 68 then combines the interactive program and the compressed components of the television signal to form an AVI signal to be broadcast to end users via satellite uplink 62. Specific details regarding the system of FIG. 1 follow.

Television signal source 12 may comprise a live video feed and/or a video tape playback apparatus, among other mechanisms. In one embodiment, the television signal provided from television signal source 12 is compliant with the NTSC (National Television Systems Committee) signal standard. It is understood, however, that the television signal provided from television signal source 12 may be conveyed in a variety of alternative formats.

Figure 2:
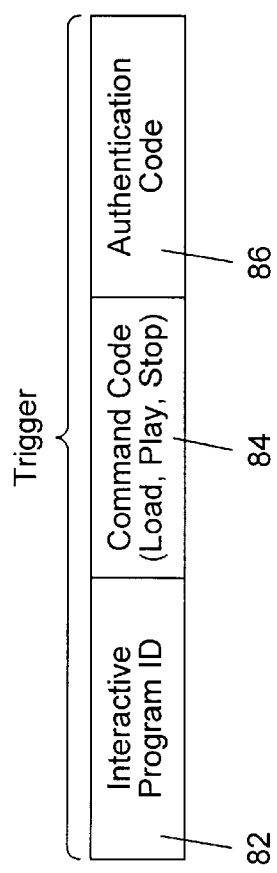
FIG. 2 is a diagram illustrating exemplary information contained within a trigger generated by the remote network.

As stated previously, trigger generator 14 is provided to generate a trigger including information to control an interactive program associated with the television signal from television signal source 12. This trigger may take a variety of forms. For example, FIG. 2 illustrates an exemplary trigger wherein information for controlling an interactive program is digitally encoded. The trigger of FIG. 2 includes an Interactive Program ID field 82 that contains a value to identify a designated program stored by an interactive program source (i.e., the interactive program source 60 of FIG. 1), and a Command Code field 84 that contains a value to control the interactive program source. In one implementation, Command Control values are defined to cause the interactive program to load (pre-roll), play (roll), or stop. The exemplary trigger of FIG. 2 finally includes an Authentication Code field 86 that contains a value used as a signature to authenticate the trigger, as will be explained further below.

Referring back to FIG. 1, trigger insertion unit 16 is configured to combine a television signal from television source 12 with a trigger from trigger generator 14. In one implementation, trigger insertion unit 16 includes a VBI (vertical blanking interval) encoding mechanism which inserts a trigger into the vertical blanking region of the NTSC television signal. This combined signal is then provided to modulator 18 for transmission in a conventional manner. It is specifically contemplated that in alternative configurations, trigger insertion unit 16 may combine the trigger with the television signal using other techniques, such as DTMF (dual tone multi-frequency) coding or ancillary data carrier in the transmission.

When the transmission from remote network 10 is received by broadcast station 50, it is demodulated by demodulator 54. At this point, the combined television-trigger signal may be converted from its analog format into a digital format, such as the SMPTE 259M studio standard. The combined signal may further be routed through a video network, where it may be processed and/or taped and time-shifted. Subsequently, the combined signal is provided to trigger extraction unit 56. The extracted trigger and remaining television signal are then separately routed to interactive program source 58 and AVI generation unit 60, respectively.

For configurations in which the trigger is inserted within the vertical blanking interval of the television signal, trigger extraction unit 56 is implemented with a VBI decoder. It is noted that depending upon the manner in which triggers are inserted, other mechanisms to implement trigger extraction unit 56 may be alternatively employed, such as a DTMF decoder or a demodulator.

Interactive program source 58 is a source of interactive program information used to control, for example, operations of a set-top box. It will be appreciated that the set-top box is typically responsive to a user's remote control and provides an interactive display output to the user's television. The interactive program source 58 may be formed by a flow manager and server including a plurality of interactive programs contained in mass storage, such as a disk array. The interactive programs contained in mass storage may be installed from floppy disk, from tape storage, or through remote downloading, among other mechanisms.

When interactive program source 58 receives a trigger, it first authenticates the trigger by determining whether the Authentication Code of the trigger is an authorized value. If the trigger passes the authentication check, interactive program source 58 performs an operation in accordance with the Command Code and Interactive Program ID of the trigger. For example, interactive program source 58 may first receive a command to load an interactive program specified by Interactive Program ID "1011", in response to which interactive program source 58 loads the specified program from mass storage into a local memory (i.e., DRAM). Interactive program source 58 may then receive a command to play the program specified by Interactive Program ID "1011", in response to which interactive program source 60 outputs the specified interactive program in a bit stream to data input unit 66.

AVI generation unit 60 is a mechanism configured to combine a television signal from trigger extraction unit 56 with an interactive program from interactive program source 58 to thereby generate an AVI signal for subsequent transmission. The A-V compression unit 64 as illustrated within the specific embodiment of FIG. 1 is configured to compress the television signal using a compression algorithm such as MPEG2. A-V compression unit 64 is further configured to packetize the compressed audio and video components of the television signal into fixed bit length packets, and to provide a header for each packet for identification. This will be explained in further detail below.

Data input unit 66 provides an interface for interactive program information conveyed from interactive program source 58 to AVI transmission unit 66. Data input unit 66 may temporarily buffer interactive program information until AVI transmission unit 68 can receive the information. Similar to the output of A-V compression unit 64, interactive program information provided from data input unit 66 is packetized into fixed bit-length packets, with a header associated with each for identification. It is noted that the interactive program information may be alternatively packetized by interactive program source 58.

AVI transmission unit 68 is configured to combine the respective outputs of A-V compression unit 64 and data input unit 66 to form an AVI signal at its output. In one embodiment, AVI transmission unit is implemented using a multiplexer which time division multiplexes the respective audio, video and interactive program packets. The resulting time division multiplexed signal is then modulated on a carrier for transmission via satellite uplink 62.

Figure 3:
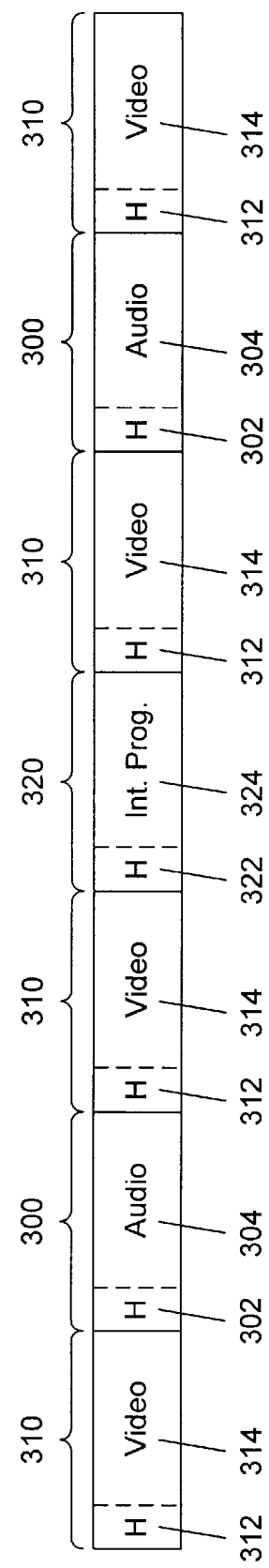
FIG. 3 is a diagram illustrating an exemplary format of an AVI signal.

FIG. 3 illustrates an exemplary format of an AVI signal generated by AVI transmission unit 68. The signal format of FIG. 3 includes time division multiplexed packets of audio, video, and interactive program information. Each audio packet 300 includes a header field 302 (designated by "H") and a data field 306. Similarly, each video packet 310 includes a header field 312 and a data field 314. Finally, each interactive program packet 320 includes a header field 322 and a code/data field 324. It will be appreciated that in the illustrated AVI signal, many more video packets 310 are transmitted as time elapses in comparison to the number of audio packets 300 and the number of interactive program packets 320. This is to accommodate the relatively high bandwidth requirements of video. The system supervisor may dynamically control the bandwidth allocations provided to the video, audio and interactive program packets, respectively, depending upon the particular requirements of the system at a given time. It is noted that the header of each packet is used by a receiving set top box to reassemble the television signal as well as the interactive program information according to an electronic program guide locally available in the set top box.

Further details regarding an exemplary embodiment of AVI generation unit 60 may be found within U.S. Pat. No. 5,448,568 entitled "System For Transmitting An Interactive TV Signal" by Delpuch et al. This patent is incorporated herein by reference in its entirety.

Figure 4:
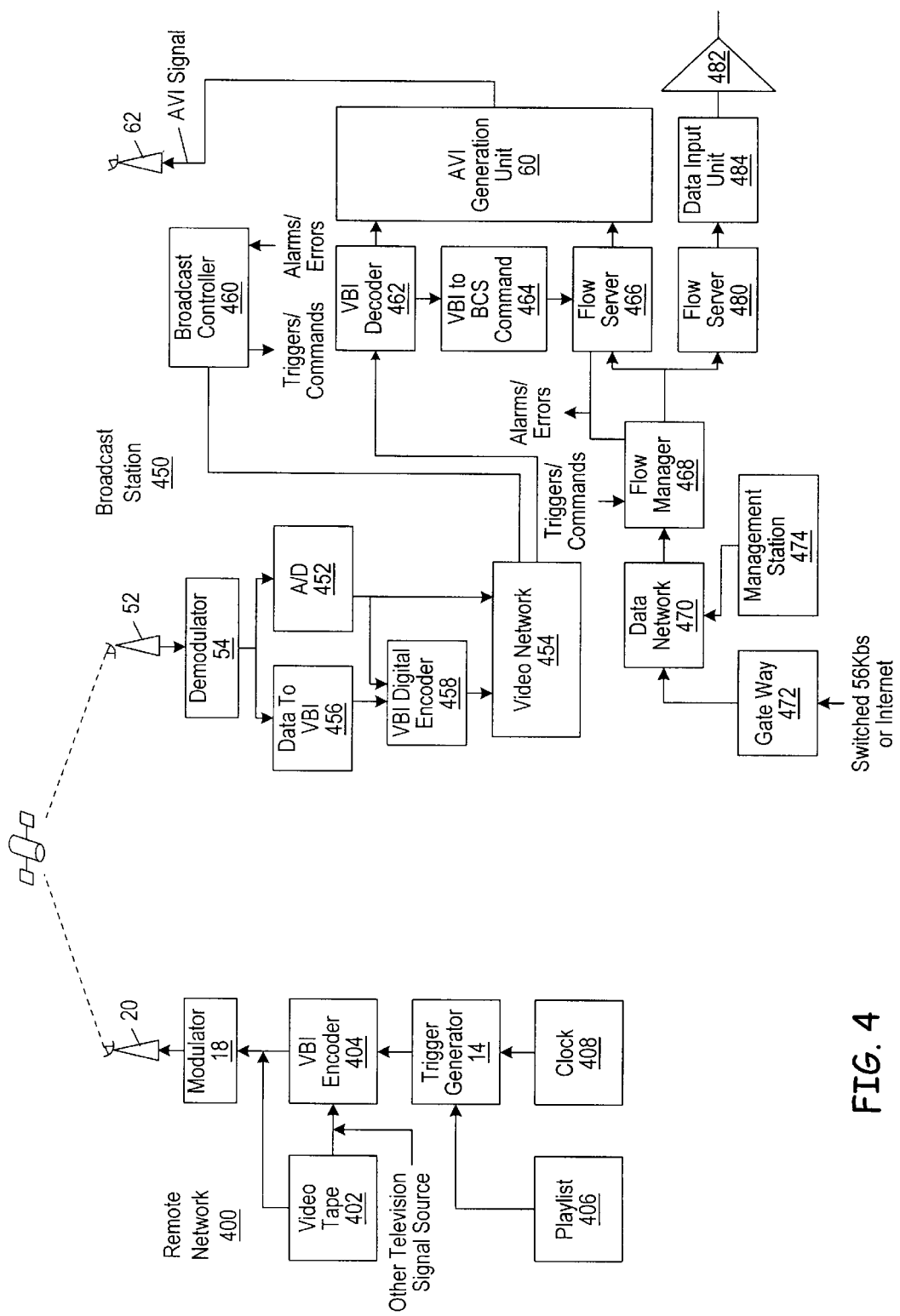
FIG. 4 is a block diagram of a flow manager and server architecture for an interactive television system in accordance with another embodiment of the present invention.

Turning next to FIG. 4, a block diagram of a flow manager and server architecture for an interactive television system in accordance with another embodiment of the present invention is shown. Circuit portions that correspond to those FIG. 1 are numbered identically for simplicity and clarity.

The system of FIG. 4 includes a remote network 400 for conveying a television signal via a satellite uplink to a broadcast station 450 in a manner similar to that of the system of FIG. 1. FIG. 4 illustrates a video tape playback apparatus 402 coupled to a VBI encoder 404. The VBI encoder 404 encodes trigger information generated by trigger generator 14 within the vertical blanking interval of a television signal from video tape playback apparatus 402 or from an alternative television signal source. Triggers are generated by trigger generator 14 in accordance with an electronic playlist 406 indicating the programs to be transmitted. A clock 408 is further coupled to trigger generator 14 to provide a time reference. It is noted that the electronic playlist 406 may further be coupled to control the specific television signal provided to VBI encoder 404, and that the playlist 406 may be implemented using a computer system. It is finally noted that video tape playback apparatus 402 may provide an output with trigger information already inserted within the vertical blanking interval of the television signal. This output may bypass VBI encoder 404 and be provided directly to modulator 18. In addition, similar to the embodiment of FIG. 1, trigger information could be provided with the television signal using techniques such as DTMF coding or data carrier in the transmission. Such alternative trigger insertion techniques may be employed in the event that adequate VBI bandwidth is unavailable.

After the combined television-trigger signal is received and demodulated by broadcast station 450, the analog television signal is converted to a digital format by analog-to-digital converter 452. For the embodiment of FIG. 4, the SMPTE 259M digital television signal standard is employed. If the trigger information was encoded within the vertical blanking interval of the television signal, the digitized signal is then routed directly to the video network 454.

Broadcast station 450 includes a data-to-VBI conversion unit 456 which may be employed when the trigger information from remote network 400 is provided using an alternative coding scheme, such as DTMF coding or data carrier in the transmission. The data-to-VBI conversion unit 456 is configured to convert the trigger information received by broadcast station 450 to digitized information which can be inserted into the vertical blanking interval of the digitized television signal by VBI digital encoder 458. In this manner, television signals provided to video network 454 are encoded with trigger information within their vertical blanking intervals. Incorporating the trigger information directly within the digitized television signal itself avoids the necessity of having to know the delays associated with the television signal as it propagates through video network 454 (i.e., compared to a situation wherein the trigger information is routed via a different path to the trigger extraction mechanism).

Video network 454 is configured to process incoming television signals and may tape and/or time shift these signals. Video network 454 is further employed to assign designated incoming television signals to specified channels broadcast from digital broadcast station 450. It is noted that the illustrated output from video network 454 to VBI decoder 462 corresponds to a designated channel of broadcast station 450, and that additional, similarly configured channels may further be provided. Video network 454 is controlled by a broadcast controller 460.

Similar to the embodiment of FIG. 1, after passing through video network 454, a digitized television signal is provided to a VBI decoder 462 which extracts the VBI trigger information and provides a SMPTE 259M digitized television signal (without trigger information) to AVI generation unit 60. The extracted trigger information is provided to a VBI-to-BCS command unit 464, which converts the VBI digitized command into the native command format employed by broadcast controller 460. The native command corresponding to the trigger is then provided to flow server 466 or flow manager 468 to control the loading or playing of an interactive program designated by the trigger. AVI generation unit 60 combines the interactive programming information with the audio and video components of the television signal to form an AVI signal for transmission via satellite uplink 62.

FIG. 4 illustrates a data network 470 and a gateway 472 through which interactive application programs can be loaded into flow manager 468. The gateway 472 may be coupled to remote locations via modem or internet. A management station 474 is further coupled to data network 472 allow local control of the downloading of interactive application programs into flow manager 468.

FIG. 4 finally illustrates an optional second flow server 480 which is also configured to receive interactive application programs from flow manager 468. The application programs are then provided to a transmitter 482 through a data input unit 484. The interactive program channel formed by flow server 480, data input unit 484, and transmitter 482 are advantageously provided to allow interactive program transmissions independent of an associated television signal. The output of transmitter 482 may be conveyed via a separate transponder of a satellite transmitting the AVI signal from satellite uplink 62.

It is noted that the architecture of FIG. 4 further allows broadcast controller 460 to control the generation of AVI signals for television programs that are provided locally to video network 454. It is further noted that broadcast controller 460 may receive alarms and errors from various system resources such as flow manager 468 and flow server 466.

The systems of FIGS. 1 and 4 advantageously allow interactive programming information to be inserted at the proper time within a television signal being turned around at a digital broadcast station. The remote network may control the order of playing of the interactive programming information and may invoke day of air edits, while the digital broadcast station is allowed to maintain control over the content and actual airing of the interactive programming information.

Figure 5:
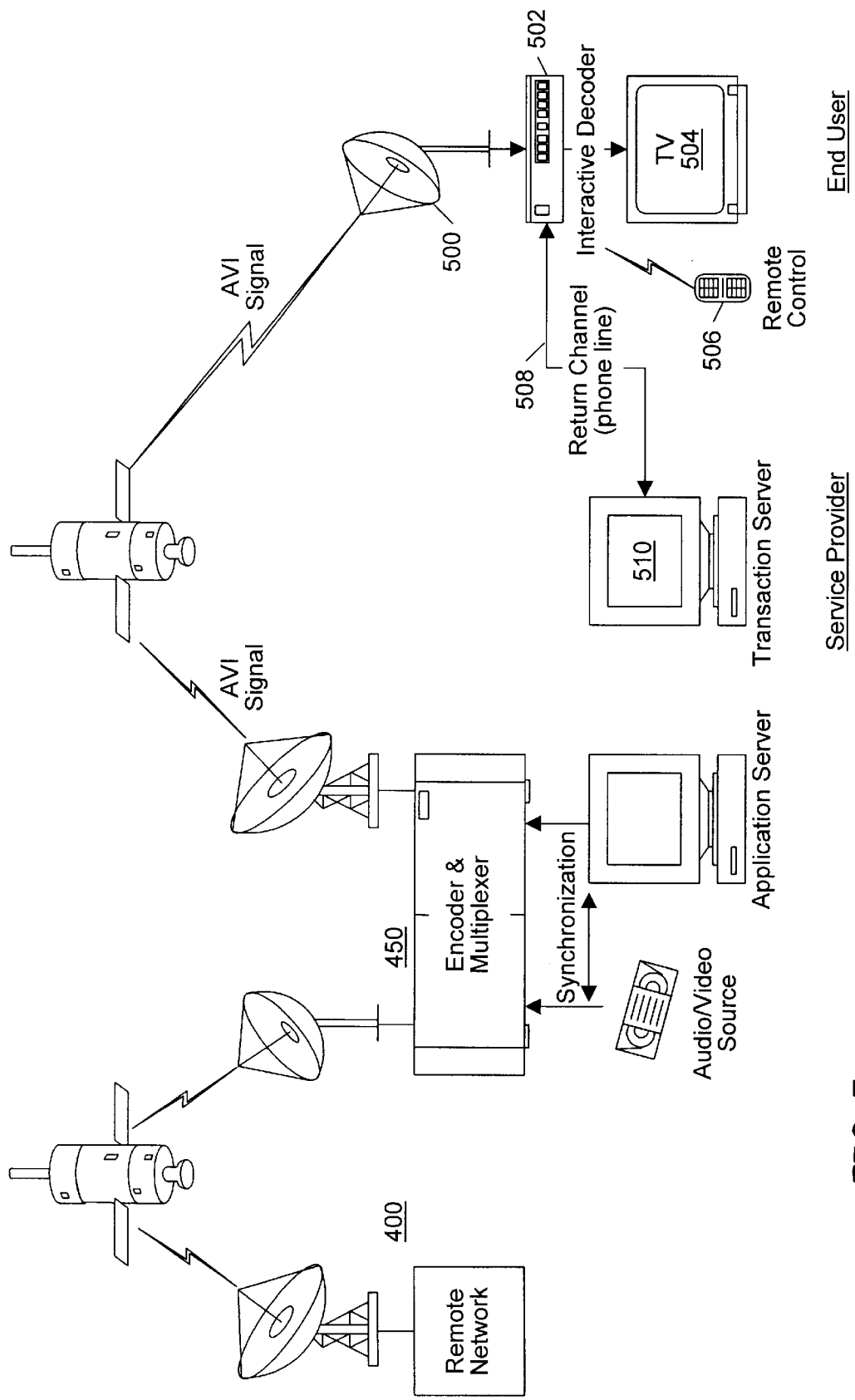
FIG. 5 is a block diagram of an interactive television system in accordance with an embodiment of the present invention.

Turning finally to FIG. 5, a block diagram of an interactive television system employing the remote network 400 and broadcast station 450 of FIG. 4 is shown. FIG. 5 illustrates the receipt of an AVI signal from broadcast station 450 by an end user via a satellite downlink 500. The AVI signal is decoded by an interactive set top box 502 which provides an output to a television set 504. The interactive decoder 502 executes an interactive application program conveyed within a selected AVI signal to allow interactivity by a user under control of a remote control 506. A return channel 508 utilizing a phone line and associated modems (not shown) interconnects the interactive decoder 502 to a transaction server 510, which monitors certain selections by the user and responds accordingly, as desired.

Numerous variations and modifications will become apparent to those skilled in the art once the above disclosure is fully appreciated. For example, it is understood that information comprising numerous additional television programs may be time-multiplexed within an AVI signal generated by AVI generation unit 60. In addition, a variety of alternative implementations for AVI generation unit 60 are contemplated.

It is also understood that the combined signal referred to above may be conveyed from the remote network using a variety of alternative wireless or wired transmission mechanisms, such as Internet, cable or telephone line. Still further, it is noted that any type of video source may be utilized in the place of television signal source 12. It is intended that the following claims be interpreted to embrace all such variations and modifications.

What is claimed is:

1. An interactive television system comprising:
    a remote network including:
        a television signal source for providing a television signal;

a trigger generator configured to generate an interactive command to control an interactive program associated with said television signal;

a trigger insertion unit coupled to said television signal source and to said trigger generator, wherein said trigger insertion unit is configured to generate a combined signal including said television signal and said interactive command; and a transmitter coupled to receive said combined signal and configured to convey said combined signal; and a broadcast station including:

a receiver configured to receive said combined signal;

a trigger extraction unit coupled to said receiver and configured to extract said interactive command from said combined signal;

an interactive program source coupled to receive said interactive command from said trigger extraction unit, wherein said interactive program source is configured to control said interactive program in response to said interactive command; and an interactive TV signal generation unit coupled to said trigger extraction unit and to said interactive program source, wherein said interactive TV signal generation unit is configured to combine said television signal with said interactive program to form an audio-video-interactive output signal.

2. The interactive television system as recited in claim 1 wherein said trigger insertion unit is configured to insert said interactive command within a vertical blanking interval of said television signal.

3. The interactive television system as recited in claim 2 wherein said trigger extraction unit is configured to extract said interactive command from said vertical blanking interval of said television signal.

4. The interactive television system as recited in claim 1 wherein said transmitter includes a modulator coupled to receive said combined signal and configured to modulate said combined signal upon a carrier.

5. The interactive television system as recited in claim 4 wherein said receiver includes a demodulator coupled to said trigger extraction unit and configured to demodulate said carrier to obtain said combined signal.

6. The interactive television system as recited in claim 1 wherein said interactive program source is a flow manager configured to store said interactive program.

7. The interactive television system as recited in claim 6 wherein said flow manager is configured to store a plurality of additional interactive programs.

8. The interactive television system as recited in claim 1 wherein said interactive command includes a load command code to cause said interactive program source to load said interactive program.

9. The interactive television system as recited in claim 1 wherein said interactive command includes a play command code to cause said interactive program source to provide said interactive program to said interactive TV signal generation unit.

10. The interactive television system as recited in claim 1 wherein said interactive command includes an interactive program ID to identify said interactive program.

11. The interactive television signal as recited in claim 1 wherein said interactive command includes an authentication code, and wherein said interactive program source is configured to verify that said authentication code is an authorized value before responding to said interactive command.

12. The interactive television system as recited in claim 1 wherein said broadcast station further includes an analog-to-digital converter coupled between said receiver and said trigger extraction unit, wherein said analog-to-digital converter is configured to convert said combined signal from an analog format to a digital format.

13. The interactive television system as recited in claim 12 wherein said broadcast station further includes a video network coupled to receive said combined signal in a digital format from said analog-to-digital converter and configured to route said combined signal to said trigger extraction unit.

14. The interactive television system as recited in claim 1 wherein said interactive TV signal generation unit is configured to time-multiplex audio and video components of said television signal with components of said interactive program to form said audio-video-interactive output signal.

15. The interactive television system as recited in claim 1 further comprising an end user site including an interactive decoder coupled to receive said audio-video-interactive output signal and configured to execute said interactive program.

16. The interactive television system as recited in claim 15 wherein said end user site further includes a television set coupled to said interactive decoder.

17. A remote network for an interactive television system comprising:

a trigger generator configured to generate an interactive command to control an interactive program source to correspondingly control an interactive program associated with a video signal;

a trigger insertion unit coupled to said trigger generator, wherein said trigger insertion unit is configured to generate a combined signal including said video signal and said interactive command; and a transmitter coupled to receive said combined signal and configured to convey said combined signal.

18. The remote network for an interactive television system as recited in claim 17 further comprising a television signal source coupled to said trigger insertion unit and configured to provide said video signal.

19. The remote network for an interactive television system as recited in claim 17 wherein said trigger insertion unit is configured to insert said interactive command within a vertical blanking interval of said video signal.

20. The remote network for an interactive television system as recited in claim 17 wherein said transmitter includes a modulator coupled to receive said combined signal and configured to modulate said combined signal upon a carrier.

21. The remote network for an interactive television system as recited in claim 17 wherein said interactive command includes a load command code to cause said interactive program source to load said interactive program.

22. The remote network for an interactive television as recited in claim 17 wherein said interactive command includes a play command code to cause said interactive program source to provide said interactive program to said interactive TV signal generation unit.

23. The remote network for an interactive television system as recited in claim 17 wherein said interactive command includes an interactive program ID to identify said interactive program.

24. A broadcast station for an interactive television system comprising:

a receiver configured to receive a combined signal including a video signal and an interactive command;

a trigger extraction unit coupled to said receiver and configured to extract said interactive command from said combined signal; and an interactive program source coupled to receive said interactive command from said trigger extraction unit, wherein said interactive program source is configured to control said interactive program in response to said interactive command.

25. The broadcast station for an interactive television system as recited in claim 24 wherein said video signal is a television signal.

26. The broadcast station for an interactive television system as recited in claim 25 further comprising an interactive TV signal generation unit coupled to said trigger extraction unit and to said interactive program source, wherein said interactive TV signal generation unit is configured to combine said television signal with said interactive program to form an interactive TV signal.

27. The broadcast station for an interactive television system as recited in claim 24 wherein said trigger extraction unit is configured to extract said interactive command from a vertical blanking interval of said video signal.

28. The broadcast station for an interactive television system as recited in claim 24 wherein said receiver includes a demodulator coupled to said trigger extraction unit and configured to demodulate a carrier to obtain said combined signal.

29. The broadcast station for an interactive television system as recited in claim 24 wherein said interactive program source is a flow manager configured to store said interactive program.

30. The broadcast station for an interactive television system as recited in claim 29 wherein said flow manager is configured to store a plurality of additional interactive programs.

31. The broadcast station for an interactive television system as recited in claim 24 wherein said interactive command includes a load command code to cause said interactive program source to load said interactive program.

32. The broadcast station for an interactive television system as recited in claim 26 wherein said interactive command includes a play command code to cause said interactive program source to provide said interactive program to said interactive TV signal generation unit.

33. The broadcast station for an interactive television system as recited in claim 24 wherein said interactive command includes an interactive program ID to identify said interactive program.

34. The broadcast station for an interactive television signal as recited in claim 24 wherein said interactive command includes an authentication code, and wherein said interactive program source is configured to verify that said authentication code is an authorized value before responding to said interactive command.

35. The broadcast station for an interactive television system as recited in claim 24 further comprising an analog-to-digital converter coupled between said receiver and said trigger extraction unit, wherein said analog-to-digital converter is configured to convert said combined signal from an analog format to a digital format.

36. The broadcast station for an interactive television system as recited in claim 35 further comprising a video network coupled to receive said combined signal in a digital format from said analog-to-digital converter and configured to route said combined signal to said trigger extraction unit.

37. The broadcast station for an interactive television system as recited in claim 26 wherein said interactive TV signal generation unit is configured to time-multiplex audio and video components of said television signal with components of said interactive program to form said audio-video-interactive output signal.

38. A method for providing interactive program content with a video signal originating at a remote network comprising:

generating an interactive command at said remote network to control an interactive program associated with said video signal;

combining said video signal with said interactive command to form a combined signal;

transmitting said combined signal from said remote network;

receiving said combined signal at a broadcast station;

extracting said interactive command from said combined signal; and controlling an interactive program source in response to said interactive command extracted from said combined signal.

39. The method as recited in claim 38 further comprising generating an audio-video-interactive output signal by combining said interactive program with said video signal.

40. The method as recited in claim 38 wherein said controlling said interactive program source includes outputting said interactive program from said interactive program source.

41. The method as recited in claim 38 wherein said combining said video signal with said interactive command includes inserting said interactive command within a vertical blanking region of said video signal.

* * * * *